United States Patent
Wan et al.

(10) Patent No.: US 10,320,628 B2
(45) Date of Patent: Jun. 11, 2019

(54) CONFIDENCE SCORING OF DEVICE REPUTATION BASED ON CHARACTERISTIC NETWORK BEHAVIOR

(71) Applicant: Cedexis Inc., Portland, OR (US)

(72) Inventors: Jacob Wan, Victoria (CA); Greg Unrein, Portland, OR (US); Martin Kagan, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 780 days.

(21) Appl. No.: 13/965,003

(22) Filed: Aug. 12, 2013

(65) Prior Publication Data
US 2014/0379902 A1    Dec. 25, 2014

Related U.S. Application Data

(60) Provisional application No. 61/837,073, filed on Jun. 19, 2013.

(51) Int. Cl.
*H04L 12/26* (2006.01)
*H04L 12/24* (2006.01)
(Continued)

(52) U.S. Cl.
CPC ............ *H04L 43/04* (2013.01); *H04L 41/142* (2013.01); *H04L 61/1511* (2013.01);
(Continued)

(58) Field of Classification Search
CPC ......... H04L 43/04; H04L 12/26; H04L 43/10; H04L 63/10; H04L 67/22; H04L 63/1441; H04L 61/1511; H04L 41/142
See application file for complete search history.

(56) References Cited

U.S. PATENT DOCUMENTS 5,629,928 A * 5/1997 Calvignac ........... H04L 12/5602
370/237
5,716,422 A    2/1998 Muffoletto et al.
(Continued)

FOREIGN PATENT DOCUMENTS

WO        00/14940 A1    3/2000
WO    2011/046790 A1    4/2011
WO    2011/056796 A1    5/2011

OTHER PUBLICATIONS

Vikrum5000. Identifying the DNS server used to fullfill an HTTP request. Jan. 14, 2013. 4 pages.
(Continued)

*Primary Examiner* — Backhean Tiv
(74) *Attorney, Agent, or Firm* — Klarquist Sparkman, LLP

(57) ABSTRACT

The technology disclosed relates to detection of anonymous proxies and bots making requests to a cloud based resource on the Internet, such as a web server or an App server. The technology can leverage one or more of: instrumentation of web pages that samples response times and other characteristics of communications by a requestor device over multiple network segments; lack of prior appearance of the requestor device across multiple, independently operated commercial web sites; and resolver usage by the requestor. These signals can be analyzed to score a requesting device's reputation. A location reported by a user device can be compared to a network characteristic determined location.

19 Claims, 3 Drawing Sheets

(51) Int. Cl.
  *H04L 29/08* (2006.01)
  *H04L 29/12* (2006.01)
  *H04L 29/06* (2006.01)

(52) U.S. Cl.
  CPC .......... *H04L 63/1441* (2013.01); *H04L 67/22* (2013.01); *H04L 43/0864* (2013.01); *H04L 67/02* (2013.01); *H04L 67/10* (2013.01)

(56) References Cited

U.S. PATENT DOCUMENTS

| | | | |
|---|---|---|---|
| 6,006,260 | A | 12/1999 | Barrick, Jr. et al. |
| 6,014,660 | A | 1/2000 | Lim et al. |
| 6,330,590 | B1 | 12/2001 | Cotten |
| 6,446,121 | B1 | 9/2002 | Shah et al. |
| 6,601,098 | B1 * | 7/2003 | Case ................. H04L 29/12009 370/253 |
| 6,606,643 | B1 * | 8/2003 | Emens .................... H04L 29/06 709/200 |
| 6,868,068 | B1 * | 3/2005 | Jain ...................... H04L 43/087 370/252 |
| 6,996,616 | B1 | 2/2006 | Leighton et al. |
| 7,003,555 | B1 | 2/2006 | Jungck |
| 7,152,105 | B2 | 12/2006 | McClure et al. |
| 7,155,723 | B2 | 12/2006 | Swildens et al. |
| 7,525,921 | B1 | 4/2009 | Yi Dar Lo |
| 7,574,499 | B1 | 8/2009 | Swildens et al. |
| 7,580,356 | B1 | 8/2009 | Mishra et al. |
| 7,594,029 | B2 | 9/2009 | Fujita et al. |
| 7,596,619 | B2 | 9/2009 | Leighton et al. |
| 7,680,276 | B2 | 3/2010 | Steinberg |
| 7,725,602 | B2 | 5/2010 | Liu et al. |
| 7,840,699 | B2 | 11/2010 | Fujita et al. |
| 7,912,978 | B2 | 3/2011 | Swildens et al. |
| 7,962,582 | B2 | 6/2011 | Potti et al. |
| 8,059,557 | B1 * | 11/2011 | Sigg ...................... H04W 28/16 370/252 |
| 8,122,102 | B2 | 2/2012 | Wein et al. |
| 8,402,543 | B1 | 3/2013 | Ranjan et al. |
| 8,447,837 | B2 | 5/2013 | Devanneaux et al. |
| 8,819,227 | B1 * | 8/2014 | Keralapura ............ H04L 45/38 709/203 |
| 9,385,988 | B2 | 7/2016 | Kagan |
| 9,553,844 | B2 | 1/2017 | Kagan |
| 2001/0049741 | A1 | 12/2001 | Skene et al. |
| 2002/0052942 | A1 | 5/2002 | Swildens et al. |
| 2002/0052972 | A1 | 5/2002 | Yim |
| 2002/0078233 | A1 | 6/2002 | Biliris et al. |
| 2002/0087666 | A1 * | 7/2002 | Huffman ........... H04L 29/12009 709/220 |
| 2002/0120727 | A1 * | 8/2002 | Curley .................... H04L 41/12 709/223 |
| 2002/0174358 | A1 | 11/2002 | Wolff et al. |
| 2003/0017104 | A1 | 1/2003 | Spitler et al. |
| 2003/0088671 | A1 | 5/2003 | Klinker et al. |
| 2004/0047349 | A1 | 3/2004 | Fujita et al. |
| 2004/0068582 | A1 | 4/2004 | Anderson et al. |
| 2004/0073691 | A1 | 4/2004 | Sun |
| 2004/0073707 | A1 | 4/2004 | Dillon |
| 2004/0114673 | A1 * | 6/2004 | Panchal ............... H04B 1/7117 375/148 |
| 2004/0138858 | A1 * | 7/2004 | Carley ................. H04L 41/142 702/186 |
| 2004/0179689 | A1 | 9/2004 | Maggenti et al. |
| 2004/0215707 | A1 | 10/2004 | Fujita et al. |
| 2004/0215977 | A1 | 10/2004 | Goodman et al. |
| 2005/0091378 | A1 | 4/2005 | Nonnenmacher |
| 2005/0097179 | A1 | 5/2005 | Orme |
| 2005/0193073 | A1 | 9/2005 | Mehr et al. |
| 2005/0286564 | A1 | 12/2005 | Hatley et al. |
| 2006/0031319 | A1 | 2/2006 | Nelson et al. |
| 2006/0075139 | A1 | 4/2006 | Jungck |
| 2006/0112176 | A1 | 5/2006 | Liu et al. |
| 2006/0129672 | A1 | 6/2006 | Mayer |
| 2006/0143293 | A1 * | 6/2006 | Freedman ............... H04L 45/02 709/225 |
| 2006/0218644 | A1 | 9/2006 | Niles et al. |
| 2006/0253582 | A1 | 11/2006 | Dixon et al. |
| 2007/0005689 | A1 | 1/2007 | Leighton et al. |
| 2007/0033645 | A1 | 2/2007 | Jones |
| 2007/0043863 | A1 | 2/2007 | Schlesener et al. |
| 2007/0174402 | A1 | 7/2007 | Tomkow |
| 2007/0210528 | A1 | 9/2007 | Baber |
| 2007/0214283 | A1 | 9/2007 | Metke et al. |
| 2007/0288588 | A1 | 12/2007 | Wein et al. |
| 2008/0005086 | A1 | 1/2008 | Moore |
| 2008/0037536 | A1 * | 2/2008 | Padmanabhan ......... H04L 45/04 370/389 |
| 2008/0046970 | A1 | 2/2008 | Oliver et al. |
| 2008/0056163 | A1 * | 3/2008 | Chan ...................... H04L 41/12 370/255 |
| 2008/0168536 | A1 | 7/2008 | Rueckwald |
| 2008/0205292 | A1 * | 8/2008 | Denby ................. H04L 43/0829 370/254 |
| 2008/0307057 | A1 | 12/2008 | Prentiss, Jr. |
| 2009/0083413 | A1 | 3/2009 | Levow et al. |
| 2009/0094311 | A1 | 4/2009 | Awadallah et al. |
| 2009/0187654 | A1 | 7/2009 | Raja et al. |
| 2009/0210528 | A1 | 8/2009 | Swildens et al. |
| 2009/0246636 | A1 | 10/2009 | Chiang et al. |
| 2009/0327517 | A1 | 12/2009 | Sivasubramanian et al. |
| 2009/0328209 | A1 | 12/2009 | Nachenberg |
| 2010/0016787 | A1 | 1/2010 | Shapiro et al. |
| 2010/0088405 | A1 | 4/2010 | Huang et al. |
| 2010/0115040 | A1 | 5/2010 | Sargent et al. |
| 2010/0125673 | A1 | 5/2010 | Richardson et al. |
| 2010/0161787 | A1 | 6/2010 | Jones |
| 2010/0269174 | A1 | 10/2010 | Shelest |
| 2010/0287019 | A1 * | 11/2010 | Guo ...................... G06F 11/3442 709/224 |
| 2011/0185423 | A1 | 7/2011 | Sallam |
| 2012/0047173 | A1 | 2/2012 | Thomas |
| 2013/0061321 | A1 * | 3/2013 | Gardner ............ H04L 29/12066 726/22 |
| 2013/0179544 | A1 * | 7/2013 | Sainnsbury ............. H04L 67/34 709/219 |
| 2014/0143162 | A1 * | 5/2014 | Hanson ............... H04L 63/1408 705/317 |
| 2014/0143438 | A1 | 5/2014 | Kagan et al. |
| 2014/0149208 | A1 * | 5/2014 | Zwicky .................. G06Q 30/02 705/14.45 |
| 2014/0179238 | A1 * | 6/2014 | Wynn .................. H04L 41/5067 455/67.11 |
| 2014/0280884 | A1 * | 9/2014 | Searle ................. H04L 43/0864 709/224 |
| 2014/0379902 | A1 * | 12/2014 | Wan ...................... H04L 41/142 709/224 |
| 2015/0051975 | A1 * | 2/2015 | Kadous ............... G06Q 30/0261 705/14.58 |
| 2015/0215267 | A1 | 7/2015 | Kagan |
| 2016/0182331 | A1 * | 6/2016 | Iannaccone ........... G06Q 10/06 709/224 |
| 2016/0205174 | A1 * | 7/2016 | Pitio ...................... H04L 67/10 709/201 |

OTHER PUBLICATIONS

Mao, Z., et al., "A Precise and Efficient Evaluation of Proximity Between Web Clients and Their Local DNS Servers." USENIX ANnual Technical Conference, General Track. 2002.

Mockapetris, P., "Domain Names—Implementation and Specification," Network Working Group, RFC 1035, Copyright Nov. 1987, 56 pages.

PCT/US2010/051720—International Search Report, dated Nov. 26, 2010, 2 pages.

PCT/US2010/055145,—International Search Report dated Jan. 10, 2011, 3 pages.

"Cisco ACE GSS 4492R Global Site Selector—Data Sheet", Cisco Systems Inc., Copyright Nov. 2009, 9 pages.

PCT/US2010/051720—Written Opinion dated Nov. 26, 2010, 4 pages.

(56) References Cited

OTHER PUBLICATIONS

PCT/US14/42905—International Preliminary Report on Patentability, dated Jul. 30, 2015, 5 pages.
PCT/US2014/042905—International Search Report, dated Oct. 29, 2014, 21 pages.
Ruohomaa et al., "Reputation management survey," The Second International Conference on Availability, Reliability and Security, 2007, <http://ieeexplore.ieee.org/xpl/login.jsp?tp=&arnumber=4159793&url=http%3A%2F%2Fieeexplore.ieee.org%2Fxpls%2Fabs_all.jsp%3Farnumber%3D4159793> retrieved Apr. 13, 2007.
ViSolve, "Optimized Bandwidth + Secured Access= Accelerated Data Delivery," A ViSolve White Paper, ViSolve, Inc., Mar. 2009, pp. 1-14.
CN 201080049987.6—Office Action dated May 27, 2014, 17 pages.
Olston et al., "Adaptive Filters for Continuous Queries over Distributed Data Streams" SIGMOD 2003, Jun. 9-12, 2003, pp. 563-574.
EP 10823851—Supplemental European Search Report dated May 10, 2013, 5 pages.
Wikipedia, "Web cache," Apr. 9, 2009, <https://web.archive.org/web/20090423703117//http://en.wikipedia/cor/wiki/Web_cache>, retrived Aug. 26, 2014, 2 pages.
CN 201080049987.6—Office Action dated Apr. 10, 2015, 8 pages.

\* cited by examiner

CONFIDENCE SCORING OF DEVICE REPUTATION BASED ON CHARACTERISTIC NETWORK BEHAVIOR

RELATED APPLICATIONS

This application is related to and claims the benefit of U.S. Prov. App. No. 61/837,073 entitled Confidence Scoring of Device Reputation Based on Characteristic Network Behavior filed Jun. 19, 2013. The provisional application is hereby incorporated by reference.

This application is related to and incorporates by reference the following commonly owned applications: U.S. application Ser. No. 13/502,100 entitled DNS Application Server, which is a section 371 national stage of PCT PCT/US10/51720, which claims the benefit of U.S. Prov. App. No. 61/251,136; U.S. application Ser. No. 13/502,106 entitled Internet Infrastructure Survey, which is a section 371 national stage of PCT PCT/US10/55145, which claims the benefit of U.S. Prov. App. No. 61/258,042; and U.S. application Ser. No. 13/882,153 entitled Surrogate Name Delivery Network, which is a section 371 national stage of PCT PCT/US11/57743, which claims the benefit of U.S. Prov. App. No. 61/258,042.

BACKGROUND

Field

The technology disclosed relates to detection of anonymous proxies and bots making requests to a server on the Internet. Additionally, the technology can assist in the determination of location.

Related Art

Bots and anonymous proxy usage can wreak havoc. Many defensive mechanisms have been devised to detect, divert and otherwise defeat unwelcome and often hostile traffic. For instance, by validating interactive sessions by correlating indications of human interaction events to interactive sessions. Similarly, others have advocated the use of machine learning based botnet detection with dynamic adaptation. Commercial products supporting this approach are available.

It is desirable to provide tools that detect bots and anonymous proxy usage. More secure networks and applications can result from use of such tools.

SUMMARY

The technology disclosed relates to detection of anonymous proxies and bots making requests to a cloud based resource on the Internet, such as a web server or an App server. The technology can leverage one or more of: instrumentation of web pages or application that sample response times and other characteristics of communications by a requestor device over multiple network segments; lack of prior appearance of the requestor device across multiple, independently operated commercial web sites or applications; and DNS resolver usage by the requestor. These signals can be analyzed to score a requesting device's reputation. Additionally, the technique can be used to assess the physical location of the requestor device and assign confidence levels to that assessment. A location reported by a user device can be compared to a network characteristic determined location. Other aspects and advantages of the technology disclosed can be seen on review of the drawings, the detailed description and the claims, which follow.

DETAILED DESCRIPTION

Figure 1:
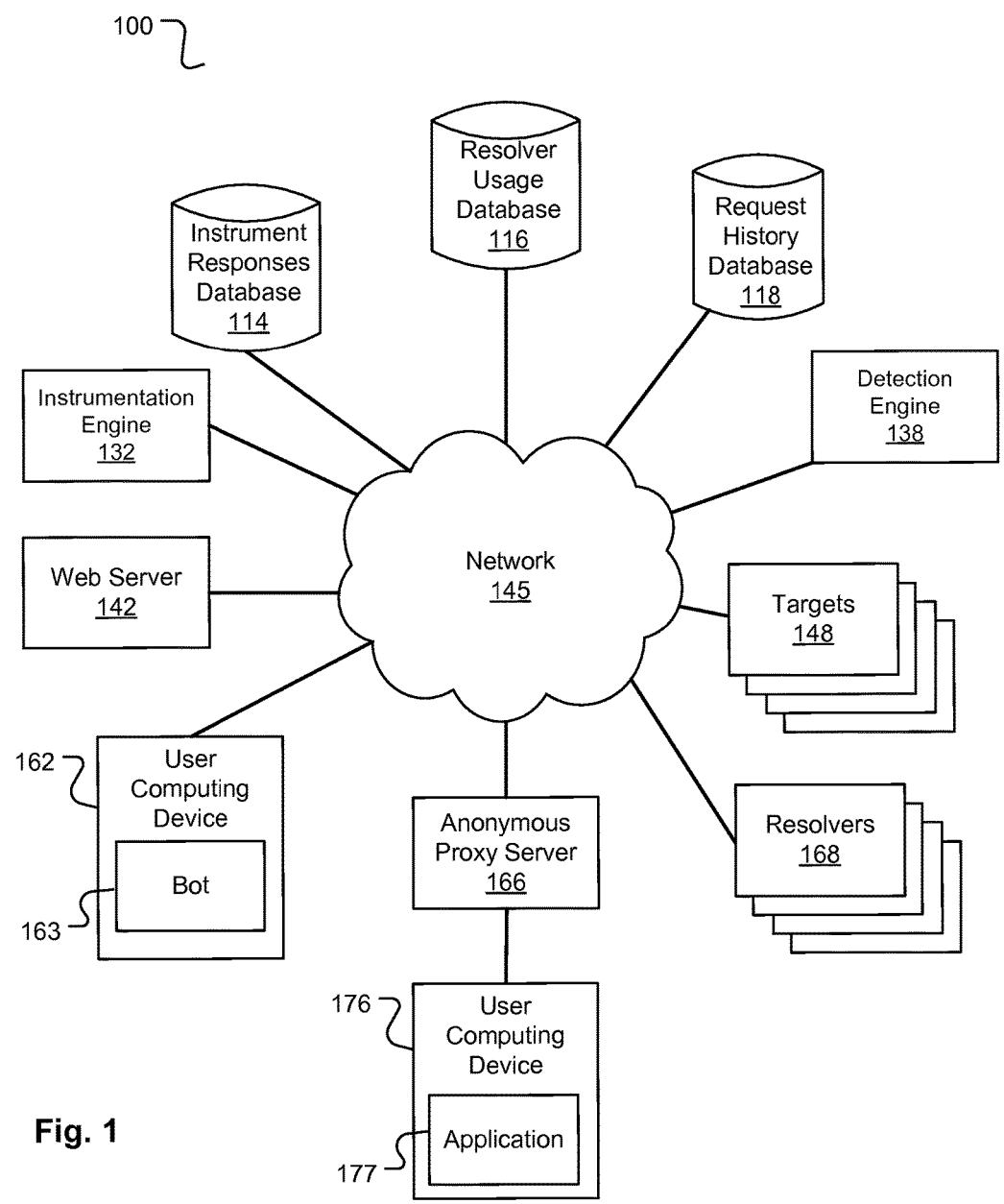
FIG. 1 is a high level block diagram of an example environment in which the reputation scoring can be used to detect bots and anonymous proxy server usage.

The following detailed description is made with reference to the figures. Preferred embodiments are described to illustrate the technology disclosed, not to limit scope, which is defined by the claims. Those of ordinary skill in the art will recognize a variety of equivalent variations on the description that follows. A detailed description of implementations of the technology disclosed is provided with reference to the FIGS. 1-7.

Much analysis depends on constructing signals. Applicant has developed several new signals that individually and in combination can be analyzed to determine the reputation of or assign a reputation to a requestor device that correlates with the likelihood that the device is a bot or is operating through an anonymous proxy server. These signals can be analyzed for requests ostensibly made by either browsers or apps. The term signal as used herein generally refers to identification of information based on analysis of data. As such, signals need not refer to wires or traces or waveforms.

Past work by this assignee used statistical information about individual requestor-target pairs to measure network performance. Traffic could then be directed from a particular location to a well-performing network based on comparison of recent individual statistics returned from the multiple alternative destinations. For instance, response times of alternative content delivery networks (CDNs) have been measured and selection among available CDNs prioritized based on their measured performance at a time and from a location close to requestor device making the request. However, fingerprint analysis was not performed and the result of detecting bots or anonymous proxy usage was not realized.

One new type of signal is an instrumented response pattern signal. (The shorthand names for these signals are labels of human convenience only, drawing on intuitions about the corresponding data, users, and/or behaviors.) A web page or app is instrumented to generate sample responses to messages from the requestor device to multiple targets over diverse network segments. A resulting pattern of responses, when composited, forms a so-called instrumented response pattern signal. A web page includes, for example, Javascript code that causes the requestor device to send messages to and receive responses from a target. The code can, for instance, record connect time and/or one or more round trips between a requestor device and a target. The code can detect availability of various targets and throughput rates. Multiple instances of the code can be used to generate fingerprint-like instrumented response pattern vectors involving multiple targets.

By comparing the new signal to a large set of recently collected measurements by other clients in the same CIDR block (i.e., location), one can calculate the percentile rank into which this new signal belongs. In other words, what is the 'likelihood' that the test signal belongs in this set? A measurement which falls into the $50^{th}$ percentile can be said to be normal. A signal which falls in the $5^{th}$ or 95th can be said to be unusual.

This is new instrumented response pattern analysis can be used to provide benefits not previously realized. In the web page case, the instrumentation can take the form of Javascript code included in the page which causes messages and processes respective responses to be recorded and sent to a server for analysis. In the case of an app, e.g. an application for iOS, Android, Windows Phone, or even for a desktop operating system, the application itself could be linked via an API or SDK to a library that serves a similar function to the Javascript.

Another signal is a so-called newbie signal that identifies a requestor device with characteristics that are new or have little history of making requests to the type of site involved. This newbie signal involves comparing requestor device characteristics to a history of requests made at numerous, independently operating web sites. In one cookie-free implementation, a requestor device does not have a unique identifier. Nonetheless, it has at least one IP address, a browser identifier and an operating system identifier. As further explained below, request collection across hundreds of independently operating web sites generates a request history database that can be used to score a requestor device reputation as newbie, well-recognized or in between. Thus for example, the first time a user with a new device on a new network accesses a website it would be viewed as a newbie, 20 accesses and a day or two later it might not.

Yet another signal is a resolver usage signal, or DNS resolver usage signal. Resolvers include DNS servers and authoritative DNS servers. Many business networks use local DNS servers that are not visible outside the business' network. A web page or app is instrumented to identify the resolver used by requestor devices that make hostname resolution requests from URLs. The identification of the resolve typically is in the form of an IP address. The identity of resolvers used by devices at individual IP addresses, proxy IP addresses, CIDR blocks and ASNs can be compiled and probability distributions estimated for use of particular resolvers by a request from a requestor device reporting particular IP address.

Examples of a bot and anonymous proxy server usage may be instructive. Suppose a bot is generating numerous requests to a server. First, we can apply the instrumented response pattern analysis. In some instances, the bot ignores Javascript on the returned web page, so it does not return any instrumented response pattern data. In other instances, the bot fakes its instrumented response pattern data, but does not know the response time to a newly instrumented target. Or, one of the normally used targets happens to be unavailable or responding particularly slowly, so the faked data is incorrect. The bot may be able to run simple instrumentation scripts, but not be equipped to run throughput tests in the instrument suite. Or, the bot's use of resources to respond to instrumentation could expose its activity to distributed denial of service (DDoS) mitigation software. The bot is not registered with the DDoS mitigation software as a browser expected to make a pattern of instrumented requests to targets identified to the DDoS mitigation software, so the pattern of requests exposes it presence.

Second, the newbie signal analysis can be applied. The bot knows some of the characteristics of the workstation where it resides (or purports to reside), including its IP address and operating system ID. However, it guesses wrong on the browser ID, because a new browser version has been installed on the corporate network since the bot was launched. The bot reports a browser ID "x.y.z" but recent browsers from that ASN/CIDR have been "a.b.c". The inconsistency negatively affects the newbie signal score. Or, the corporate network is running an older version of a popular browser than the bot expected. In some examples, the corporate network is unavailable for visiting web shopping sites, so the IP address of the bot will not appear in the request history database.

The newbie signal also can take into account honesty in a completing enrollment forms. In some implementations, indicated device/bot/user locations, e.g. indicated in enrollment form submissions, are compared to predicted actual locations based on the signals. In these embodiments, if an enrollee is claiming to be in New York City when completing a web form, but the instrumentation signals suggest a Mountain View device location, the user input mismatches the instrumented signals. The mismatch can be handled by a web site or application developer on a case-by-case basis. For example, in a dating application, a user claiming to be in New York City, but physically in Mountain View could be blocked from appearing in New York City "local" results until the discrepancy is resolved.

Third, the resolver usage signal can reveal that no resolver is used by the bot. In some instances, the bot may be identifying its targets by IP address instead of URL, without using a resolver at all. Or, it may be using a special resolver to obtain instructions and report its resolver, instead of the host's or network's normal resolver(s).

Processing these various signals, individually or in combination, a detection engine can assign a reputation score to a device that in turn reveals the device as likely to be a bot.

Anonymous proxy server usage also can be screened using these signals. First, the instrumented response pattern of a user overseas using a domestic proxy server will be much different than the pattern from a domestic user. Specifically, consider content that is supposed to be geographically limited to residents of a first country, e.g. BBC iPlayer content within the UK. Now consider a device geographically within the United States trying to access that UK-based content via a proxy server. The instrumented responses from the US-based device will be different than a UK-based device. Those differences are reflected in the signals and ultimately the scores. Second, the newbie signal could be triggered when a proxy user rotates usage of proxies to avoid building a reputation from a particular anonymous server. Third, the resolver usage signal may report a resolver used by the user's machine, as opposed to the proxy machine. Using these various signals, individually or in combination, a detection engine can assign a score that reveals physical or logical separation between network locations of the user and the proxy server.

FIGURES DISCUSSED

FIG. 1 is a high level block diagram of an example environment 100 in which reputation scoring technology can be used to detect bots and anonymous proxy server usage. This figure is architectural in nature. As such, boxes and connecting lines should be understood to indicate general functionality and interrelationships between systems, as opposed to the underlying physical systems or connection topology. Most notably, all network connections are simplified to a single network 145; however, a feature of some embodiments is detecting and recognizing usage patterns within different networks, e.g. at the IP address, CIDR, and/or ASN level. Nonetheless, this simplification aids in explanation. The components in FIG. 1 reflect user computing devices 162, 176 that make requests (requestor devices), Web servers 142 that deliver web pages instrumented by an instrumentation engine 132, and a detection engine 138 together with data and targets relied on by the detection engine. As used herein, Web servers 142 can be any cloud-based resource, such as one serving a web site or interacting with a client App. Conventional user computing devices use a browser or an app to make requests. The devices receive instrumented web pages or instructions that cause the browser or app to report back various measurements taken from the user computing device. The detection engine 138 analyzes measurements reported back for signals of whether the user computing device 162 is being controlled by a bot 163 or the user computing device 176 is running an application 177 from a location that is hidden by an anonymous proxy server 166.

User computing devices 162, 176, web server 142, anonymous proxy server 166, resolvers 168, instrumentation engine 132, and detection engine 138 each include memory for storage of data and software applications, a processor for accessing data in executing applications, and components that facilitate communication over the communications network. The user computing devices 162, 176 execute applications, such as a bot 163, a web browser, a mobile app or, more generally, an application 177, that formulate requests to the Web server 142.

The anonymous proxy server 166 can hide the IP address of the user computing device 176 when interacting with the Web server 142. The web or other server 142 is connected to the network 145 to user computing devices and respond to requests from the user computing devices.

The instrumentation engine 132 provides code or instructions (sometimes called survey code) to the web or other server 142 that, when executed by the user computing device, generates and returns measurements taken from the user computing device. These measurements can be returned to the Web server 142 and relayed to the detection engine 138, relayed through a DNS server (not shown) to the detection engine 138, or sent directly to the detection engine 138.

Examples and details regarding survey code supplied by the instrumentation engine 132 to the web or other server 142 are given and U.S. application Ser. No. 13/502,106 entitled "Internet Infrastructure Survey", which is referred to and incorporated by reference above. Similar code can be used with other applications, such as applications running on mobile devices. Measurements calculated or tested by the code can include a time delay associated with accessing the test resource(s). A time delay may include one or more of the following: a response, or "round-trip" time (RTT; elapsed time between sending a transmission requesting a resource and receiving erects fonts); connect times (such as a time to make an IP connection, an SSL connection, or a connection to a transaction application server); and the time between transmission bytes (i.e. a speed of transmission, typically measured in bytes per second). Additional measurements can include error or data corruption rate (such as a percent of bad bytes or bad packets, or rate of packet loss), a connection failure variability or jitter, such as the variability of transmission speed or error rate), throughput (an indicator of transmission speed) and a measure of availability (an indicator of whether or not a connection or service was completed). Measurements such as transmission time and jitter may involve transmission of relatively large files, larger than 10 kilobytes, whereas measures of the availability and connect time can involve short messages.

Databases of instrument responses 114, resolver usage 116 and device request history 118 can be compiled using techniques as described in the "Internet Infrastructure Survey" application, cited above, or using other techniques. These databases provide reference signals for reference devices at reference IP addresses. That is, based on historical data, a device with a source IP address at reference IP address is expected to produce a particular pattern of signal components. The reference IP address may be identified with approximate location, either a physical location or a logical network segment. The reference signals are available for comparison to reported signals associated with the user computing devices 162, 176. In some implementations, this data is collected from 10-100 independently operated websites using the instrumentation code. On other embodiments data can be from 100 to 300 or from at least 300 independently operated websites. It can be from content delivery networks and users of content delivery networks.

The instrument responses database 114, for instance, can be compiled based on reports delivered to resolvers or DNS servers using pseudo-URLs. The same results can be reported for compilation in this database and to be used for detection of bots and anonymous proxy server usage.

The resolver usage database 116 can be generated from the same pseudo-host names used to deliver reports collected by instrumentation. A browser running the instrumentation code contacts its default DNS server with a pseudo-hostname that the default DNS servers are unable to resolve. This local resolver passes the pseudo-hostname to a registered authoritative server associated with the base domain name. The registered authoritative server receives the source IP address, the referring DNS servers IP address, and the pseudo-hostname. This allows the instrumentation engine to ultimately associate the web browser's source IP addresses with the respective resolvers. The instrumentation engine 132 can cause devices web browsers or applications to issue a DNS query with a coded pseudo-hostname be sent to a controlled authoritative DNS server 168 with a matching code to be sent to the detection engine 138. The detection engine 138 can learn which resolver 168 the user computing devices 162, 176 relies based on receiving a request to resolve the pseudo-hostname. In some embodiments, the instrumentation code for applications may be able to directly obtain the resolvers from the OS; however, the testing approach may still be used.

The request history database 118 can be compiled through DNS servers or as requests are made to the detection engine 138. At the DNS servers, characteristics of the requestor and the site to which a request is made can be coded into the pseudo-host name that is sent to the DNS server for resolution. In direct communications with the Web server or other server, the HTTP protocol automatically delivers the source IP address, browser type and version ID, and an operating system type and version ID to be used by a server when preparing a response to request. Thus, the request history database 118 can be compiled through either Web servers 142 or resolvers 168. In still other embodiments, other protocols are used to capture this information, e.g. direct transmission of data from the web browser and/or application to the instrumentation engine for storage in the database(s).

These databases can be stored collectively on multiple computers and/or storage devices. Data entries in these databases can be associated with unique identifiers. All three databases identified can be a single server or they can be on plurality of servers. Any single database may be partitioned across servers. These databases can be replicated for faster response time. Collection of very large sample sets makes these databases relatively insensitive to lost data items.

In one implementation, the network 145 includes the Internet. The network 145 can also utilize dedicated are private communication links that are not necessarily part of the Internet. In one implementation, the network 145 uses standard communications technologies, protocols, and/or inter-process communication technologies.

The targets 148 can be test resources of a content delivery network infrastructure or located elsewhere on the Internet. These test resources can be shared with an "Internet Infrastructure Survey" apparatus is described in the cited patent application. The test resource can be any type of Internet resource that, when accessed, returns a message or other form of content to web client. In one implementation, the test resource may be a JavaScript code. Examples of test resources in use at the time of this application are identified in the appendix that immediately precedes claims. This appendix was compiled using at a particular time the radar demo page at www.cedexis.com/products/speedtest.html. Compiling these statistics by running the demonstration at various times on various days can show how dynamic the round-trip and connect times are from a single location. It also supports triangulation of user locations. For instance, if the data in the appendix were known to originate from a PC in San Francisco and similar data were compiled from Seattle, Los Angeles, Denver, Chicago, New York and Miami, one could essentially triangulate the location of the computers by evaluating the actual or relative connect, response or round trip transit time between the origin computer and test resources in various known locations. The measured times could be modified, if indicated by data analysis, by time of day, provider or route load factors. Ratios of times could be used to scale times as a factor of the shortest time, before or after other adjustments.

While FIG. 1 is been described with identification of particular resolvers, servers, engines and databases, it should be recognized that many of these components could be consolidated or subdivided. Again, this is an architectural concept, rather than a limiting embodiment.

Figure 2:
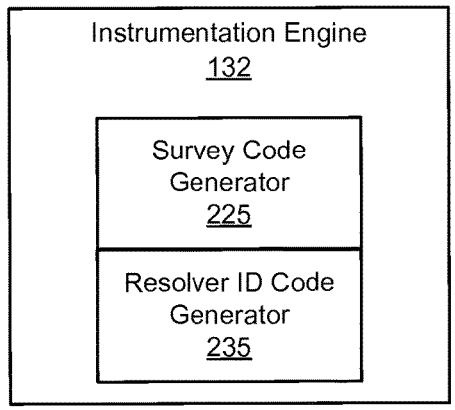
FIG. 2 is an example instrumentation engine that generates survey code and resolver ID code.

FIG. 2 is a high level block diagram of an example instrumentation engine 132 that generates survey code 225 and resolver ID code 235. More details regarding the survey code generator 225 are found in the "Internet Infrastructure Survey" application cited above. The resolver ID code generator 235 may be integrated with the survey code generator 225 or it can be a separate component. The resolver ID code generator 235 may practice either of the procedures described above or another procedure for identifying the default resolver being used by a requestor device.

Figure 3:
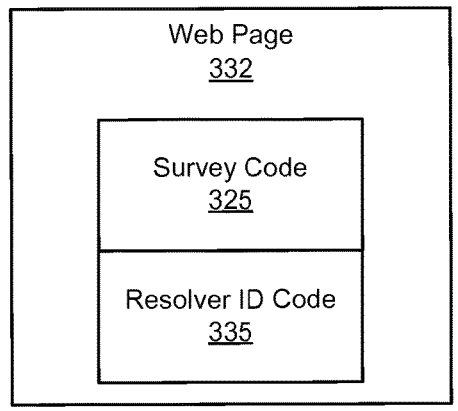
FIG. 3 is an example web page carrying survey code and resolver ID code.

FIG. 3 is a high level block diagram of an example web page 332 carrying survey code 325 and resolver ID code 335. The web page 332 would, of course, also carry content.

Figure 4:
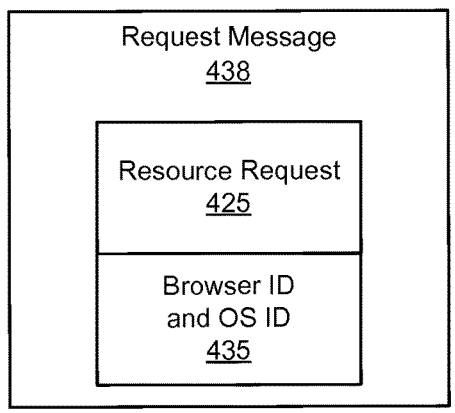
FIG. 4 is an example request message analyzed by a detection engine.

FIG. 4 is a high level block diagram of an example request message 438 analyzed by a detection engine. The message includes the requestor device's resource request 425 and an IP source address (not shown). At least when HTTP is used, a browser type and version ID and an operating system type and version ID 435 accompany the request message 438.

Figure 5:
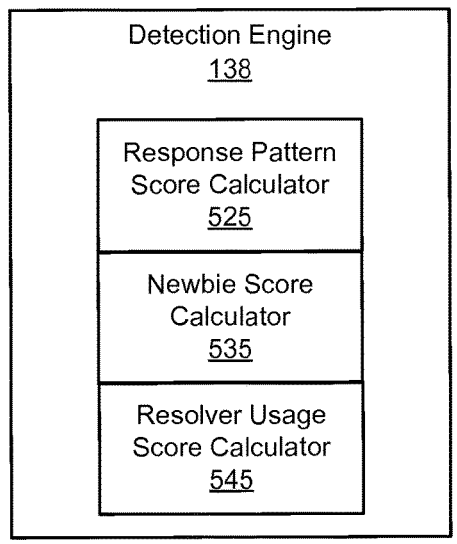
FIG. 5 is an example detection engine that scores one or more signals and returns one or more reputation scores.

FIG. 5 is a high level block diagram of an example detection engine 138 that scores one or more signals and returns one or more reputation scores. In this example, calculators illustrated include the response patterns score calculator 525, a newbie score calculator 535 in a resolver usage score calculator 545. A wide range of calculations could be applied to derive each of these scores and to combine them into a single score. The detection engine 138 can return one or more scores as parts of a reputation score for a requester device.

Calculations can be sensitive to an IP source address, proxy IP addresses, CIDR blocks or ASNs. Probability distributions can be estimated for use by the calculators based on one or more of these IP address levels of aggregation. Different aggregations can apply, depending on the source IP address reported for a requestor device. For example, one can compare a given signal to measurements collected from other IP addresses in the same CIDR block, ASN, City, Region, Country, or Continent. One could narrow or expand comparison by differentiating measurements based on the device OS and/or browser version. Each of these comparisons can be independently evaluated and then weighted to generate a final 'score'.

As indicated above, the response pattern score calculator 525 operated on data compiled using instrumentation applied to multiple targets. At least four targets can be used. More definitive results can be obtained with six, eight, ten or more targets. In the appendix, results for dozens of targets are illustrated. A wide variety of parameters can be measured for the targets. In some implementations, diversity of parameters measured can more rigorously test the user computing devices 162, 176 than a large number of targets. The measured results can be combined by the calculator into a reputation score or components of a reputation score in a variety of ways.

The following steps are an example use of an approach to calculating the reputation score:

1) A web browser loads a page containing a Radar client. The Radar client collects measurements of several web services that appear below Table 1.
2) These measurements are transmitted to a comparison service along with the IP address of the web browser from step 1.
3) The comparison service calculates a confidence score representing how likely it is that the network (autonomous system) and geographic location corresponding to the web browser's IP address accurately represents the network and geographic location of the web browser. The confidence score can be calculated as described in algorithm.py in Appendix B using frequency table data like that in Table 2.
4) The comparison service responds with the confidence score calculated in step 3.
5) The confidence score is used to decide on an action to take with respect to the web browser.

Table 1 provides an example of individual Radar measurements from Step 1.

| Web services | Measurement |
|---|---|
| Amazon EC2 - Asia Pacific (Singapore) | 191 |
| Amazon EC2 - EU (Ireland) | 191 |
| Amazon EC2 - South America | 213 |
| Amazon EC2 - US East (VA) | 94 |
| Amazon EC2 - US West (CA) | 41 |

Table 2 provides an example frequency table of a provider's performance for a specific network and geographic location as collected by the Radar community. The columns labeled 10 ms, 20 ms, 30 ms, and 6000 ms represent a count of the number of recent measurements of the given web service for this network and geographic location falling within the indicated measurement bin. The " . . . " column represents a set of this type of column snipped from the example.

| Web services | 10 ms | 20 ms | 30 ms | . . . | 6000 ms |
|---|---|---|---|---|---|
| Amazon EC2 - Asia Pacific (Singapore) | 107 | 119 | 134 | . . . | 62 |
| Amazon EC2 - EU (Ireland) | 87 | 93 | 105 | . . . | 49 |
| Amazon EC2 - South America | 40 | 42 | 41 | . . . | 89 |
| Amazon EC2 - US East (VA) | 342 | 403 | 552 | . . . | 12 |
| Amazon EC2 - US West (CA) | 499 | 617 | 855 | . . . | 6 |

Further details supporting this example are provided by the code in Appendix B.

The newbie score calculator 535 also can be tuned to evaluate measured data in a variety of ways. For instance, a threshold can be applied as a binary test. If devices sharing characteristics of the requestor device have not been observed at least "m" times and at "n" or more different web sites in the last "x" days, the requestor device can be labeled a newbie. Applying this threshold approach, m>=2 or m>=10 or m>=20 over the last 7, 14 or 30 days. Of course, other threshold values can be predetermined or calculated dynamically, and can be other values than those specifically described. Selecting 10 days instead of 7 or 14 days, for instance, is within the scope of the technology disclosed. Frequencies can be weighted, giving less weight to very recent appearances of the requestor device characteristics, for instance, or can ignore appearances of the requestor device in the most immediate time, such as the last day or two days.

Another way for the newbie score calculator 535 to report analysis of measurements would be to return a scaled order of magnitude of entries in the request history database 118 within a time range such as the last 7, 14 or 30 days. Less than "m" appearances could be scored as zero. A range of "m" to (m*10)−1 appearances could be scored as one. A range of (m*10) to (m*100)−1 could be scored as two and so forth. Generally, a logarithmic scale with an offset from zero could be applied to scoring a requestor device as a newbie. The logarithmic scale could be to the base of 10, 16 or some other rational or irrational number.

Large numbers of appearances also can be flagged as atypical of human activity, e.g. as bots. However, the number of ultimate users sharing a set of characteristics and the season (such as Black Friday or Cyber Monday) should be taken into account when determining what counts as a large number of appearances. Spikes in appearances over a period also can give away bot-like activity.

Because systems dynamically assign IP address, using services such as DHCP, a characteristic vector that combines an IP address, a browser identifier and an operating system identifier is not unique. Including a resolver used may not change the distribution, as much as it would detect use of proxies. In implementations that use a corporate proxy server IP address, a characteristic vector that combines IP address, browser identifier and operating system identifier will fall within a distribution, rather than giving a definitive signal. Favoring privacy, a non-unique characteristic vector is unlikely to be personally identifiable to a user. The attributes identified above, for instance, do not uniquely identify an end user.

In a cookie-supplemented implementation, contents of a cookie may also be available to identify the requestor device. However, such cookies can readily be copied, hijacked or forged, so uniqueness is not assured by use of cookies. Genuine cookies could contain or be correlated with user-identifying information, though that is unnecessary for these purposes. Use of cookies depends on compliance with privacy policies that protect users. Contents of a cookie can be combined with other values in the characteristic vector.

Requests from numerous requestor devices to numerous web sites can be compiled into a request history database. In one implementation, the request history database compiles characteristic vectors of requestor devices when they make requests to web sites that participate in latency measurement and/or request redirection based on measured latency. Numerous, independently operating web sites or portals can be involved. For instance, more than 100 independently operating web sites (as measured by base URLs: www-.mysite.com), or more than 300 independently operating web sites can contribute to the request history database. In other implementations, the request history database could compile characteristic vectors of requestor devices visiting web sites that collect analytics on data site access, potentially including stickiness. Characteristic vectors from latency-participant web sites and analytic-collection web sites can be combined and supplemented with characteristic vectors from participating portals or participating content delivery networks. Large data sets of non-unique appearance history data can be compiled by operators that large networks, such as redirection networks, CDN networks, large ISPs and large portals.

The resolver usage score calculator 545 can evaluate the frequency with which a particular resolver is accessed from an IP source address, proxy IP address, CIDR block or ASN. Frequencies of resolver access from an IP address or cluster of IP addresses can be reported in a variety of ways. It could be reported applying an absolute or proportional threshold, such as m>2 or, for an IP cluster, m>2 percent of DNS requests to the particular resolver. Other parameters such as 10 or 20 count or percent can be used. Time ranges for observed usage can be 7, 14 or 30 days or another predetermined period.

In some implementations, scores from multiple calculators 525, 535, 545 can be combined into fewer scores.

Figure 6:
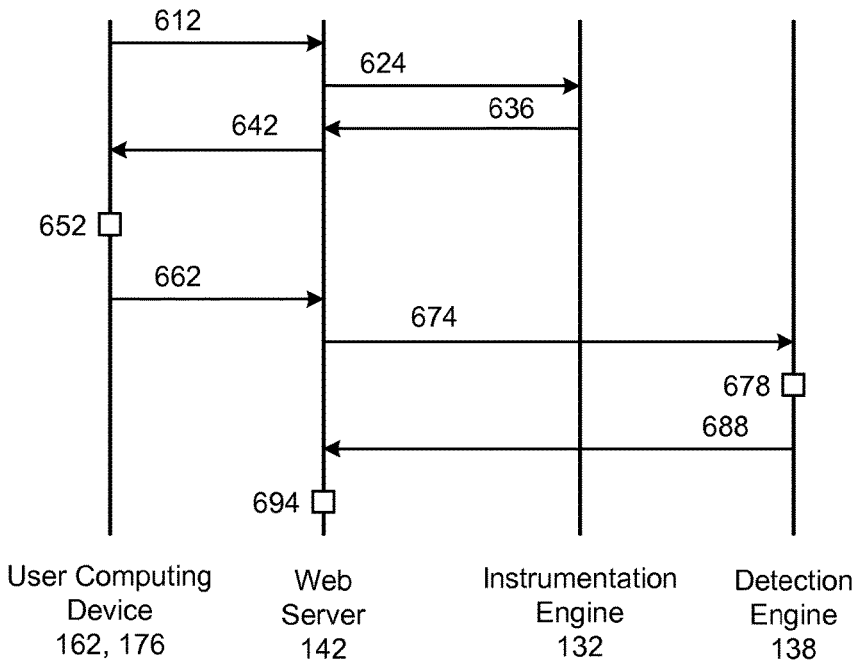
FIG. 6 illustrates an example of communications over a network leading to reputation scoring by a detection engine.

FIG. 6 illustrates an example of communications over a network leading to reputation scoring by a detection engine. For the sake of clarity and ease of understanding, not all the devices participating are indicated by vertical bars. From left to right, the vertical bars represent user computing devices 162, 176, the Web server 142, the instrumentation engine 132 and the detection engine 138. The numbers used in this figure are consistent with numbers used in prior figures. In message 612, requestor makes a request to a Web server 142 or other server. The requestor device can be a user computing device using a browser, compromised by a bot 163 or running any application 177. The requests can be made from a location concealed by an anonymous proxy server 166.

In message 624, the Web server or other server 142 requests instrumentation from the instrumentation engine 132. This request message 624 typically is unrelated to a particular client request 612, though it could be. Measurement scripts can be placed on webpages and used many times. These scripts can remain in place and be changed infrequently. Alternatively, a cache of measurement scripts can be maintained organized by IP source address, proxy IP address, CIDR block or ASN. In this alternative, measurement scripts could be incorporated in web pages responsive to the ostensible origin of the particular client request. In one or more messages 636, the instrumentation engine 132 provides the Web server or other server 142 with scripts or instructions delivered to user computing devices.

In case of a web based request 612, the server selectively injects the Javascript to perform instrumentation and/or selectively trigger the instrumentation. Ultimately, given the browser/server model and the DOM, it may be sufficient to test this once per session (session=per web site definition) or per X minutes or similar. The tests do not need to be repeated for every web page visited on a web site. Once the Javascript is injected into the page or activated on the page 642, it runs 652 on the user computing devices 162, 176 and reports the results 662. Depending on the security rules for returning the results, the results can go straight to the instrumentation engine 132, to the third party web server 142, or the detection engine 138.

In case of an App or application based request 612, the App makes a call to an SDK/API, like PerformNetworkCheck( ) or similar. The frequency of invocation is selected by the application that runs the test. Another command executed either within the App or on the App's server side like IsRobot( ) or GetScoringComponents( ) and then other logic in the application would handle.

In message 642, the server 142 delivers a webpage or instructions to a mobile app. The message includes the instrumentation script or instructions, as described above. The user computing device executes or ignores these instructions 652. If it executes these instructions, it returns measurements, either directly or through a back channel, as described above. If it ignores these instructions and fails to return measurements or other information requested, the lack of returned data is noted and it will receive a low reputation score.

In message 662, the requestor device sends measurements to the server 142 that are forwarded in message 674 to the detection engine 138. Again, depending on the security rules for returning the results, the results can go straight to the instrumentation engine 132, to the third party web server 142, or the detection engine 138. Measurements from the requestor device may reach the detection engine 138 via another route, such as through a DNS server. Following one route or another, measurements 662 from the requestor device are received by the detection engine 138.

At 678, the detection engine analyzes the data available as described above, and calculates one or more reputation scores. These reputation scores indicate a level of care, sequence or suspicion that the detection engine 138 recommends to the server 142. These reputation scores are conveyed to the server 142 in message 688. These reputation scores can be used in a variety of other useful ways. They can be stored. They can be associated with unique identifying information, if that information is available.

In some implementations, server 142 acts on 694 the reputation score message 688. In other implementations, the reputation score can be persisted for later use. When a unique identifier of the requestor device is available, the reputation score can be associated with the unique identifier, like a FICA or other credit score.

It should be understood that the messages received by and sent from the detection engine 138 can be useful by themselves. Similarly, causing the requestor device to make and report measurements also can be useful, regardless of how the measurements and signals derived from the measurements are used.

Figure 7:
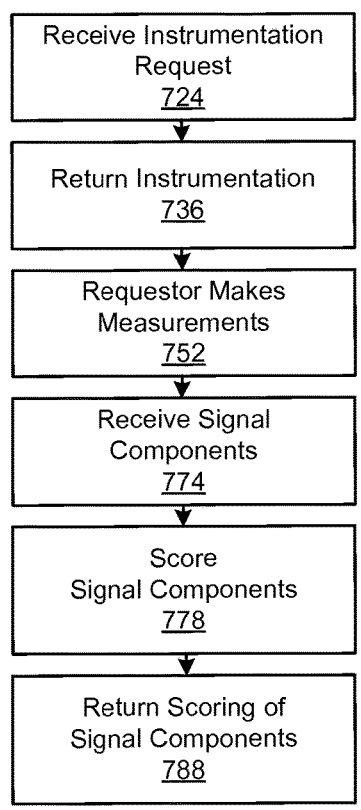
FIG. 7 is an example flow involving both an instrumentation engine and detection engine.

FIG. 7 is a high level example flow involving both an instrumentation engine and detection engine. For ease of understanding, the actions involved in this method are described with reference to the environment illustrated in FIG. 1. One of skill in the art will appreciate that the steps or actions described are not bound to or limited by any particular environment. In addition, the first two instrumentation steps can be carried out asynchronously from the last three evaluation steps. Not all of the steps need to be carried out to produce a useful result. For instance, as explained above, there can be a variety of useful dispositions of calculated scores 778, in addition to or as alternatives to returning scores 788.

At step 724, the instrumentation engine 132 receives a request for a script or instructions that can be provided to user computing devices. At step 736, the instrumentation engine responds with scripts or instructions, including instructions that cause the user computing devices to make measurements that combine to produce useful signals. There may be substantial overlap between measurements made for a general survey of Internet infrastructure and measurements that reveal information about the requestor device.

At step 752, the user computing device exercises the instrumentation and causes measurements to be taken. Or, if the request source is not a browser (for instance, a limited functionality bot) it might ignore the instrumentation and not make measurements. If it executes these instructions, it returns measurements, either directly or through a back channel, as described above. If it ignores these instructions and fails to return measurements or other information requested, the lack of returned data is noted and it will receive a low reputation score.

At step 774, the detection engine 138 receives measurements that amount to signal components. These measurements can come directly or indirectly from the user computing device. They can reach the detection engine through a web or other server 142 or another device such as an authoritative resolver or DNS server. Information can be encoded directly in messages or as pseudo-hostnames for resolution by a hierarchy of resolvers. Other encodings also could fall within the scope of the technology disclosed.

At steps 778-788, the detection engine scores signal components and returns the scores.

ADDITIONAL EMBODIMENTS

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

In one implementation, a method is described that includes evaluating a reputation of or assigning a reputation score to a requestor device that makes a request to a web site or to an application server. This implementation includes providing an initial response to the requestor device that includes an instrumented web page or instructions to be processed by an application running on the requestor device. The initial response includes code configured or adapted to collect data regarding at least network round trip latency between the requestor device and four or more target addresses and report the network round trip latency for the target addresses. Code configured or adapted to collect data, when processed using suitable hardware and software, will cause the data to be collected. Implementation further includes compiling a characteristic vector for the requestor device including at least the reported network round trip latency for the target addresses. Includes scoring the characteristic vector for similarity to expected characteristics of a reference device at a reference IP address expected to share network round trip latency characteristics with the requestor device and producing at least one reputation score. The reference IP address can match the source IP address of the requestor device or it can be in the same CIDR block or same ASN or in some other logical grouping of IP addresses expected to share network round trip latency characteristics with the source IP address.

This method another implementation technology disclosed can each optionally include one or more of the following features. The method can include reporting the reputation score to a further process and/or persisting the reputation score. When a unique identifier of the requestor device is known, the reputation score can be associated with the unique identifier.

There are several ways to carry out the scoring, which, in some instances, can be combined or used to calculate alternative scores. Scoring the characteristic vector can include using a median of estimated probability measures of characteristics in the characteristic vector taken individually. It can include combining estimated variance from the expected round trip latency characteristics for each target address in the characteristic vector. The combination can be linear or geometric. A geometric combination put involved taking a square root of a sum of squares. Scoring the characteristic vector also could include using an estimated joint probability distribution that combines at least one characteristic from each of at least four target addresses, wherein the joint probability distribution is estimated from at least 1000 samples that combine the least one characteristic from the at least four target addresses. This joint probability distribution would not assume or require that the individual distributions were independent.

A variety of other characteristics related to the requester device can be evaluated as signals. One signal is reported availability of target addresses to the requester device. As a feature of the method described above or any other method described herein, the method further includes providing the code adapted to collect data regarding at least availability of target addresses from the requestor device and report the availability of the target addresses. It also includes compiling in the characteristic vector a reported availability of the target addresses to the requestor device and scoring the characteristic vector.

Scoring the characteristic vector with the reported availability can be carried out variety of ways. Scoring can include determining whether the availability in the characteristic vector is different than expected availability of the targets to a reference device at a reference IP address expected to share availability status with the requestor device. It can include requiring the same availability or unavailability state as expected for all targets in the characteristic vector. In this context, availability status indicates whether a target is available or unavailable.

Another signal is reported throughput rates between the requestor device and the target addresses. As a feature of the method described above or any other method described herein, the method further includes providing the code adapted to collect data regarding at least throughput rates between the requestor device and the target addresses and report the throughput rates for the target addresses. It also includes compiling in the characteristic vector a reported throughput rates between the requestor device and the requestor device and scoring the characteristic vector for similarity to expected characteristics of a reference requestor device at a reference IP address expected to share throughput rate characteristics with the requestor device. Scoring the characteristic vector can include combining estimated variances between throughput in the characteristic vector and the expected throughput rate characteristics for each target address. The expected variances can be combined linearly or geometrically.

Another signal is reported connection establishment times. As a feature the method described above or any other method described herein, the method further includes providing the code adapted to collect data regarding at least connection establishment times for connections between the requestor device and the target addresses and report the connection establishment times for the target addresses. It also includes compiling in the characteristic vector a reported connection establishment times between the requestor device and the requestor device and scoring the characteristic vector for similarity to expected characteristics of a reference requestor device at a reference IP address expected to share connection establishment time characteristics with the requestor device.

Scoring the characteristic vector can include combining estimated variances between throughput in the characteristic vector and the expected throughput rate characteristics for each target address.

Another signal that can be processed is the so-called newbie signal. This signal relates flags a requestor device that has little or no history of prior appearances among the network of independently operated commercial websites. This signal can be processed in its own right or as a feature combined with any of the other methods described. As a feature, it further includes receiving requestor device characteristics including at least an IP address, browser type and version identifiers, and operating system type and version identifiers with a request from the requestor device. It also includes looking up in a requestor history database that reflects requests compiled from more than 100 independently operating servers, a frequency of requests made by devices sharing the requestor device characteristics. It includes scoring the requestor device characteristics for frequency and/or diversity of requests made to the independently operating servers within a predetermined recent time. Frequency can be scored by counting. Diversity can be scored based on the number of independently operating servers to which requests were known to be directed and the relative frequency of requests to those servers.

Scoring the requestor device characteristics can use logarithmic scaling of the frequency and/or diversity of the requests made by devices sharing the requestor device characteristics commas described above.

Yet another signal that can be processed in the so-called resolver usage signal. Signal also can be processed in its own right or is a feature combined with any of the other methods described. As a feature, it further includes providing the code adapted to collect data regarding a resolver used by the requestor device to find IP addresses corresponding to fully qualified domain names and report the resolver used by the requestor device. It further includes scoring the characteristic vector for matching expected resolver usage of a reference requestor device at a reference IP address expected to share resolver usage characteristics with the requestor device and producing at least one reputation score.

The characteristic vector for a reference requestor device in the various aspects of the methods disclosed represents a hypothetical or real device. This reference can represent a different hypothetical device for each aspect or care can be taken to use the same data sample sources across aspects of the expected characteristics. Expectations for one or more hypothetical devices can be formulated by aggregating similarly situated devices over a relevant period.

Scoring the characteristic vector can include combining estimated variance from the resolver usage characteristics of the requestor device with other signals.

Other implementations can include in a non-transitory computer readable storage medium storing instructions executable by a processor perform any of the methods and method features described above. In another implementation may include a system comprising memory in one or more processors operable to execute instructions, stored in the memory, perform a method as described above. The systems can include the components illustrated in the figures and described above. This is true both the methods described above and the additional methods described below.

In another implementation of the newbie signal processing, a method is described that includes evaluating reputation of or assigning reputation to a requestor device that makes a request to a web site. This method includes receiving requestor device characteristics including at least an IP address, browser type and version identifiers, and operating system type and version identifiers with a request from the requestor device. The method further includes looking up in a requestor history database, that reflects requests compiled from more than 100 independently operating servers, a frequency of requests made by devices sharing the requestor device characteristics and scoring the requestor device characteristics for frequency and/or diversity of requests made to the independently operating servers within a predetermined recent time.

This method in other implementations of the technology disclosed in each optionally includes one or more of the features described above or of the following features.

Scoring the requestor device characteristics can use logarithmic scaling of the frequency and/or diversity of the requests made by devices sharing the requestor device characteristics.

Results of scoring can be reported as a reputation score to a further process core, they can be persisted, as described above.

Processing the newbie signal can be combined with processing availability, or any of the other signals described above. When combined with processing availability, it further includes providing an initial response to a requestor device that includes an instrumented web page or instructions to be processed by an application running on the requestor device. The initial response includes code adapted to collect data regarding at least availability of target addresses from the requestor device and report the availability of the target addresses Period of further includes compiling in the characteristic vector a reported availability of the target addresses to the requestor device and scoring the characteristic vector. Scoring can include determining whether the availability of targets in the characteristic vector is different than expected availability of a reference device at a reference IP address expected to share availability status with the requestor device. The reference IP address can match the source IP address of the requestor device or it can be in the same CIDR block or same ASN or in some other logical grouping of IP addresses expected to share availability or unavailability status with the source IP address. Again, availability status indicates whether a target is available or unavailable.

In another implementation of the resolver usage signal, a method is described of evaluating reputation of a requestor device that makes a request to a web site. This method includes providing an initial response to a requestor device that includes an instrumented web page or instructions to be processed by an application running on the requestor device. The initial response includes code adapted to collect data regarding a resolver used by the requestor device to find IP addresses corresponding to fully qualified domain names and report the resolver used by the requestor device. The method further includes scoring the characteristic vector for matching expected resolver usage of a reference requestor device at a reference IP address expected to share resolver usage characteristics with the requestor device and producing at least one reputation score. The reference IP address can match the source IP address of the requestor device or it can be in the same CIDR block or same ASN or in some other logical grouping of IP addresses expected to share resolver usage characteristics with the source IP address.

Scoring the characteristic vector can include combining estimated variance from the resolver usage characteristics of the requestor device.

Results of scoring can include reporting a reputation score to a further process. Or, the results can be persisted, as described above.

Processing the resolver usage signal and, as with the newbie signal, be combined with processing availability or any of the other signals described above.

APPENDIX A

Sample Measurements from a Computer in California

| Provider | Connect Time(ms) | Response Time(ms) |
|---|---|---|
| Cloud Computing | | |
| Alurium - US East (Atlanta) | 224 | 81 |
| Amazon EC2 - Asia Pacific (Singapore) | 481 | 215 |
| Amazon EC2 - Asia Pacific (Sydney) | 438 | 194 |
| Amazon EC2 - Asia Pacific (Tokyo) | 392 | 148 |
| Amazon EC2 - EU (Ireland) | 394 | 168 |
| Amazon EC2 - South America | 473 | 202 |
| Amazon EC2 - US East (VA) | 254 | 97 |
| Amazon EC2 - US West (CA) | 133 | 14 |
| Amazon EC2 - US West (OR) | 120 | 35 |
| CloudSigma EU | 411 | 178 |
| CloudSigma US | 118 | 27 |
| Google AppEngine | 1231 | 1127 |
| Internap AgileCLOUD AMS | 394 | 170 |
| Internap AgileCLOUD Asia | 456 | 194 |
| Internap AgileCLOUD CA | 208 | 71 |
| Internap AgileCLOUD NY | 261 | 87 |
| Internap AgileCLOUD TX | 175 | 58 |
| Joyent - EU West | 410 | 173 |
| Joyent - US East | 273 | 93 |
| Joyent - US Southwest | 118 | 45 |
| Joyent - US West | 87 | 16 |
| PhoenixNAP Amsterdam | error | error |
| PhoenixNAP Ashburn | error | error |
| PhoenixNAP Phoenix | error | error |
| Profitbricks Germany | 421 | 183 |
| Profitbricks US | 128 | 34 |
| SoftLayer - Amsterdam | 381 | 167 |
| SoftLayer - Dallas | 222 | 58 |
| SoftLayer - San Jose | 84 | 15 |
| SoftLayer - Seattle | 127 | 31 |
| SoftLayer - Singapore | 479 | 208 |
| SoftLayer - Washington DC | 220 | 82 |
| Windows Azure - Asia East | 445 | 176 |
| Windows Azure - Asia Southeast | 478 | 204 |
| Windows Azure - EU North | 431 | 165 |
| Windows Azure - US North | 378 | 77 |
| eNocloud OpenStack | 425 | 369 |

| Global Delivery Networks | Connect Time (ms) | Response Time (ms) | Speed (kBps) |
|---|---|---|---|
| Akamai (R) | 93 | 22 | 8988 |
| Azure CDN | 49 | 18 | 6896 |
| BitGravity | 126 | 15 | 7920 |
| CDN77 | 116 | 28 | 5228 |
| CDNetworks | 109 | 18 | 10389 |
| CacheFly | 320 | 258 | 9411 |
| ChinaCache | 159 | 21 | n/a |
| CloudFlare | 108 | 18 | 7920 |
| Cloudfront | 122 | 14 | 1137 |
| Edgecast (Large) | 92 | 17 | 10256 |
| Edgecast (Small) | 85 | 16 | 9411 |
| Fastly | 138 | 26 | 5369 |
| Highwinds | 103 | 13 | 9302 |
| Internap AgileCAST | 223 | 73 | 1562 |
| Internap Streaming CDN | 133 | 20 | 10256 |
| Level3 | 116 | 18 | 12698 |
| Limelight | 106 | 14 | 10126 |
| NetDNA | 128 | 18 | 9876 |
| OnApp | 140 | 30 | 7407 |
| Pacnet | 456 | 22 | 10000 |
| Telefonica | 365 | 93 | 2056 |

APPENDIX B

Sample Probability Calculation Code

```
# Data input about the web browser for this comparison
web_browser_ip_address = 'a.b.c.d'
web_browser_asn_from_ip = 12345
web_browser_measurements = [{'provider': 'Amazon EC2 - Asia Pacific (Singapore)',
    'measurement': 191},
    {'provider': 'Amazon EC2 - EU (Ireland)',
    'measurement': 191},
    {'provider': 'Amazon EC2 - South America',
    'measurement': 213},
    {'provider': 'Amazon EC2 - US East (VA)',
    'measurement': 94},
    {'provider': 'Amazon EC2 - US West (CA)',
    'measurement': 41}]
# # Scoring approach

# Given the frequency table of a provider's performance for a specific
# network and geographic location as collected by the Radar community,
# determine the probability of this specific web browser's measurements
# occuring. Average these probabilities to determine the confidence
# score for this particular web browser.
# Initialize the probability sum to 0
probability_sum = 0
# Loop over all of the measurements taken by the browser, summing them
# in 'probability_sum'
for m in web_browser_measurement:
    provider = m['provider']
    measurement = m['measurement']
    # 'probability_for_asn' returns the probability that the given
    # 'measurement' would occur in the web browser's autonomous
    # system based on the frequency table of Radar measurements from
    # the same autonomous system for the same provider. The function
    # uses histograms like the one in Table 2 in the associated
    # notes to determine the probability.
    probability_sum += probability_for_asn(provider,
web_browser_ip_based_asn, measurement)
# Calculate the average probability
score = probability_sum / len(web_browser_measurements)
```

What is claimed is:

1. A method of evaluating reputation of a requestor device that makes a request to a cloud-based resource on the internet, including:
providing an initial response to the requestor device making a request to a cloud-based resource on the internet, the initial response including an instrumented web page or instructions to be processed by an application running on the requestor device, wherein the initial response includes code adapted to:
collect data regarding at least internet round trip latency between the requestor device and four or more target addresses, each target address being different from one another, and
report the internet round trip latency for the target addresses;
compiling a characteristic vector for the requestor device including at least the reported internet round trip latency for the target addresses;
scoring the characteristic vector for similarity to expected characteristics of a first reference device at a first reference IP address expected to share internet round trip latency characteristics with the requestor device; and
storing, on a non-transitory computer-readable medium, at least one reputation score, wherein the reputation score is based at least in part on the scoring the characteristic vector and correlates with a likelihood that the requestor device is a bot or is operating through an anonymous proxy server.

2. The method of claim 1, further including:
scoring the characteristic vector using a median of estimated probability measures of characteristics in the characteristic vector taken individually.

3. The method of claim 1, further including:
scoring the characteristic vector by combining estimated variance from the expected round trip latency characteristics for the target addresses in the characteristic vector.

4. The method of claim 1, further including:
scoring the characteristic vector using an estimated joint probability distribution that combines at least one characteristic from each of at least four target addresses, wherein the joint probability distribution is estimated from at least 1000 samples that combine the least one characteristic from the at least four target addresses.

5. The method of claim 1, further including:
providing the code further adapted to:
collect data regarding at least availability of target addresses from the requestor device and
report the availability of the target addresses; and
compiling in the characteristic vector a reported availability of the target addresses to the requestor device; and
scoring the characteristic vector by determining whether the availability of targets in the characteristic vector is different than expected availability of the targets to a second reference device at a second reference IP address expected to share availability status with the requestor device.

6. The method of claim 5, further including:
scoring the characteristic vector by requiring the same availability status as expected for all targets in the characteristic vector.

7. The method of claim 1, further including:
providing the code further adapted to:
collect data regarding at least throughput rates between the requestor device and the target addresses and
report the throughput rates for the target addresses; and
compiling in the characteristic vector a reported throughput rates between the requestor device and the target addresses; and scoring the characteristic vector for similarity to expected
characteristics of a third reference requestor device at a
third reference IP address expected to share throughput
rate characteristics with the requestor device.

8. The method of claim 1, further including: scoring the
characteristic vector by combining estimated variances
between throughput in the characteristic vector and expected
throughput rate characteristics for the target addresses.

9. The method of claim 1, further including:
providing the code further adapted to:
  collect data regarding at least connection establishment
    times for connections between the requestor device
    and the target addresses and
  report the connection establishment times for the target
    addresses; and
compiling in the characteristic vector a reported connection establishment times between the requestor device
  and the requestor device; and
scoring the characteristic vector for similarity to expected
  characteristics of a fourth reference requestor device at
  a fourth reference IP address expected to share connection establishment time characteristics with the
  requestor device.

10. The method of claim 1, further including:
receiving requestor device characteristics including at
  least an IP address, browser type and version identifiers, and operating system type and version identifiers
  with a request from the requestor device;
looking up in a requestor history database, that reflects
  requests compiled from more than 100 independently
  operating servers, a frequency of requests made by
  devices sharing the requestor device characteristics;
  and
scoring the requestor device characteristics for frequency
  and/or diversity of requests made to the independently
  operating servers within a predetermined recent time.

11. The method of claim 1, further including:
scoring requestor device characteristics using logarithmic
  scaling of the frequency and/or diversity of the requests
  made by devices sharing the requestor device characteristics.

12. The method of claim 1, further including:
providing the code further adapted to:
  collect data regarding a resolver used by the requestor
    device to find IP addresses corresponding to fully
    qualified domain names and
  report the resolver used by the requestor device; and
scoring the characteristic vector for matching expected
  resolver usage of a reference requestor device at a
  reference IP address expected to share resolver usage
  characteristics with the requestor device and producing
  at least one reputation score.

13. The method of claim 1, further including:
scoring the characteristic vector by combining estimated
  variance from resolver usage characteristics of the
  requestor device.

14. A method of evaluating reputation of a requestor
device that makes a request to a web site over the internet,
including:
  receiving requestor device characteristics including at
    least an internet protocol address, browser type and
    version identifiers, and operating system type and version identifiers with a request from the requestor device
    making the request to the web site;
  looking up in a requestor history database, that reflects
    requests compiled from more than 100 independently
    operating servers, a frequency of requests made by
    devices sharing the requestor device characteristics;
  scoring the requestor device characteristics for frequency
    and/or diversity of requests made to the independently
    operating servers within a predetermined recent time;
    and
  storing, on a non-transitory computer-readable medium,
    the scored requestor device characteristics, wherein the
    scored requestor device characteristics indicate
    whether the requestor device is a bot or is operating
    through an anonymous proxy server.

15. The method of claim 14, further including:
scoring the requestor device characteristics using logarithmic scaling of the frequency and/or diversity of the
  requests made by devices sharing the requestor device
  characteristics.

16. The method of claim 14, further comprising:
providing an initial response to a requestor device that
  includes an instrumented web page or instructions to be
  processed by an application running on the requestor
  device, wherein the initial response includes code
  adapted to:
  collect data regarding at least availability of target
    addresses from the requestor device and
  report the availability of the target addresses; and
compiling in a characteristic vector a reported availability
  of the target addresses to the requestor device; and
scoring the characteristic vector by determining whether
  the availability of targets in the characteristic vector is
  different than expected availability of a reference
  device at a reference internet protocol address expected
  to share availability status with the requestor device.

17. A method of evaluating reputation of a requestor
device that makes a request to a web site, including:
  responsive to a request from the requestor device making
    a request to the web site, providing an initial response
    to a requestor device that includes an instrumented web
    page or instructions to be processed by an application
    running on the requestor device, wherein the initial
    response includes code adapted to:
    collect and compile in a characteristic vector data
      regarding a resolver used by the requestor device to
      find IP addresses corresponding to fully qualified
      domain names and
    report the resolver used by the requestor device; and
  scoring the characteristic vector for matching expected
    resolver usage of a reference requestor device at a
    reference internet protocol address expected to share
    resolver usage characteristics with the requestor
    device; and
  storing, on a non-transitory computer-readable medium,
    at least one reputation score wherein the at least one
    reputation score correlates with a likelihood that the
    requestor device is a bot or is operating through an
    anonymous proxy server.

18. The method of claim 17, further including:
scoring the characteristic vector by combining estimated
  variance from the resolver usage characteristics of the
  requestor device.

19. The method of claim 17, further comprising:
providing the code further adapted to:
  collect data regarding at least availability of target
    addresses from the requestor device and
  report the availability of the target addresses; and
compiling in the characteristic vector a reported availability of the target addresses to the requestor device;
  and scoring the characteristic vector by determining whether the availability of targets in the characteristic vector is different than expected availability of a reference device at a reference internet protocol address expected to share availability status with the requestor device.

* * * * *